United States Patent
Feng et al.

(10) Patent No.: US 11,853,800 B2
(45) Date of Patent: Dec. 26, 2023

(54) POWER MANAGEMENT METHOD

(71) Applicant: Alibaba Group Holding Limited, Grand Cayman (KY)

(72) Inventors: Youquan Feng, Beijing (CN); Yijun Lu, Hangzhou (CN); Jun Song, Tacoma, WA (US)

(73) Assignee: Alibaba Group Holding Limited, George Town (KY)

( * ) Notice: Subject to any disclaimer, the term of this patent is extended or adjusted under 35 U.S.C. 154(b) by 463 days.

(21) Appl. No.: 17/294,973

(22) PCT Filed: Nov. 19, 2018

(86) PCT No.: PCT/CN2018/116146
§ 371 (c)(1),
(2) Date: May 18, 2021

(87) PCT Pub. No.: WO2020/102930
PCT Pub. Date: May 28, 2020

(65) Prior Publication Data
US 2022/0012098 A1      Jan. 13, 2022

(51) Int. Cl.
*G06F 9/50* (2006.01)
(52) U.S. Cl.
CPC .................. *G06F 9/5027* (2013.01)
(58) Field of Classification Search
CPC .......... G06F 9/5027; G06F 2209/5014; G06F 9/5094; Y02D 10/00
See application file for complete search history.

(56) References Cited

U.S. PATENT DOCUMENTS

| | | | |
|---|---|---|---|
| 10,686,718 B1* | 6/2020 | Wertheimer | H04L 67/60 |
| 2016/0011914 A1* | 1/2016 | Bohn | G06F 9/5094 |
| | | | 713/300 |
| 2017/0083367 A1* | 3/2017 | Chen | G06F 9/5022 |
| 2019/0041960 A1* | 2/2019 | Guim Bernat | H04L 41/5051 |
| 2019/0324819 A1* | 10/2019 | Zeng | G06F 9/5005 |
| 2020/0042068 A1* | 2/2020 | Rong | G06F 1/3203 |

FOREIGN PATENT DOCUMENTS

| CN | 104850488 A | 8/2015 |
|---|---|---|
| CN | 105159782 A | 1/2016 |
| CN | 107003706 A | 8/2017 |

OTHER PUBLICATIONS

PCT International Search Report & Written Opinion for Application No. PCT/CN2018/116146, dated Aug. 20, 2019, 7 pgs.

\* cited by examiner

*Primary Examiner* — Sisley N Kim
(74) *Attorney, Agent, or Firm* — Lee & Hayes P.C.

(57) ABSTRACT

Apparatuses and methods for providing resources are provided that include receiving power statuses of resources of a system capable of providing the resources; quantifying the power statuses of the resources; calculating an available soft capacity of the system based on the quantified power statuses and a total capacity of the system; and providing an assigning amount of the resources beyond the calculated available soft capacity to one or more users.

20 Claims, 8 Drawing Sheets

POWER MANAGEMENT METHOD

BACKGROUND

Cloud computing is commonly and widely used today and has become a fundamental facility for various kinds of applications. With the fast growth of cloud business, the massive demand for cloud products emerges in the market. More and more Internet Data Centers (IDCs) are established to feed the rapidly growing market demand and a great number of physical devices residing in the IDC are required to support the cloud service. Physical devices may be virtualized as Virtual machines (VMs), virtual storages, and virtual network equipment to be provided/sold to users as products or service on which business applications may run. The IDC may consume a large amount of power to support the applications running.

Cloud platforms may use hypervisors available from various suppliers for virtualization to provide cloud service. Generally, the more power a server consumes, the more tasks the server can perform. When the load is heavy, the cloud platform may consume a great amount of power. However, the above cloud platforms focus on how to virtualize physical hardware and schedule resources without considering the overall power efficiency of the system.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
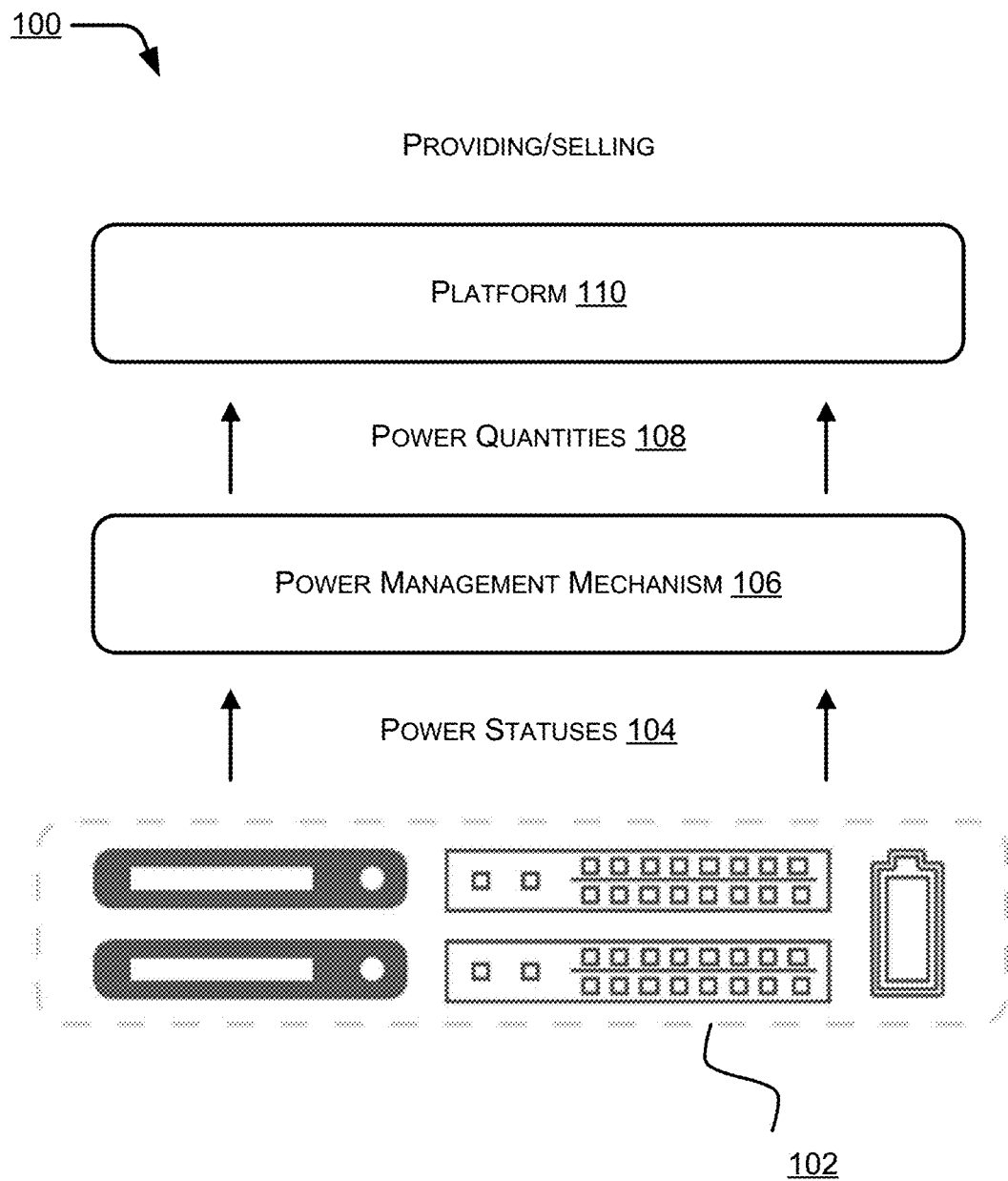
FIG. 1 illustrates an example block diagram of a system for power management.

Providing of resources in cloud service may be implemented based on a measurement of an amount of resources such as counting the number of CPU cores, the size of memory, and the capacity of storage. However, such way of providing may bring complexity to the system implementation and maintenance.

Apparatuses and methods discussed herein are directed to improving power efficiency, and more specifically to improving providing of resources based on power management.

Apparatuses and methods discussed herein may be usable for improving providing of resources based on power management. A power management mechanism may collect power statuses of resources of a resource providing system (system) which is able to provide resources. The power management mechanism may quantify the power statuses of the resources and calculate an available soft capacity of the system based on the quantified power statuses and a total capacity of the system. The total capacity may refer to the total amount of resources that the system may provide. The available soft capacity may refer to an available amount of resources of the system that is not fixed but changes over time. The total capacity and the available soft capacity may be represented in power units, which may be represented in Watt. The system may provide an assigned amount of the resources beyond the calculated available soft capacity to one or more users.

Providing the assigned amount of the resources beyond the calculated available soft capacity to one or more users may be performed as follows. The system may determine that at least one user of the one or more users requests some of the resources from the system. The system may assign an amount of resources to the at least one user. The system may determine that an amount of resources consumed by the at least one user is less than the amount of resources assigned to or purchased by the at least one user. The system may return at least a portion of a difference between the amount of resources assigned to or purchased by the at least one user and the amount of resources actually consumed by the at least one user for assigning to other users of the one or more users.

The system may determine whether the assigned amount of resources is greater than or equal to a threshold set by the system. If the assigned amount of resources is greater than or equal to the threshold, the system may stop assigning the resources to a user requesting resources from the system. The threshold may be set dynamically or periodically.

Additionally, or alternatively, a predetermined amount of resources may be reserved to address a traffic peak. The traffic peak may refer to significant spikes of user demand in a certain period. For example, the traffic during the peak hours may increase by a certain percentage, for example, 200%, 300%, 400%, etc. of the average traffic load, and the system may determine that there is a traffic peak. The predetermined reserved amount of resources may not be assigned to any user when there is no traffic peak. If the system determines that there is a traffic peak, the predetermined reserved amount of resources may be used as part of the available soft capacity to address the traffic peak. After the traffic peak, the system may reserve the predetermined amount of resources again.

Terminologies throughout the context may be denoted as follows. Virtual infrastructure may refer to cloud virtual products including but not limited to virtual machines, virtual switches, virtual storage, etc. Virtualization system may refer to a software platform that manages virtual infrastructures over physical servers and equipment. Information Technology (IT) resources may refer to computing nodes, storage devices, network devices, etc. Examples of the IT resources may include computers, VMs, containers, processes, etc. IDC devices may refer to all devices in an IDC room, except the IT resource equipment, including but not limited to air-cooler, fans, Uninterruptible Power Supplies (UPS), server farms/central battery packs, racks, etc. IDC hardware may refer to the IT resources and IDC devices. Providing may refer to the providing/selling of volatile product or service beyond actual supply.

To provide stable and reliable services, an application owner needs to make sure that the application always runs in a steady state. Thus, the application owner may buy sufficient cloud products/service from a cloud products/service provider to handle potential business traffic peak. When running on the physical hardware of the platform, all virtual facilities and applications may consume power all the time. However, the traffic peak may last for a short time and take up a small part of the day.

From the point of view of products/service provider, resources such as VMs, memories, storage devices may be provided/sold because all applications may not run at the same time and the resources may not be consumed at their maximum capacities. In other words, products/service provider may sell/provide more resources than the actual capacity of the platform.

In a system which provides resources/services such as an IDC, power consumption accounts for a large portion of the total cost. The IDC is used as an example of a variety of different systems that can provide resources/services for the sake of description, rather than limiting the application to the IDC. Enhancing the value per power unit may save power consumption of the system. The power unit may be in Watt or any other suitable metrics. Value per power unit may refer to the economic value produced by one power unit. For example, $10 ($20, $30, etc.) worth of resources/services may be produced by consuming one power unit. The value per power unit may be improved by providing resources based on power management so as to improve economic efficiency and make a contribution to energy conservation.

Providing of resources in a system may be implemented in various ways. For example, providing may be based on a measurement of an amount of resources such as counting the number of CPU cores, the size of memory, and the capacity of storage. For example, the number of CPU cores provided/sold in the system such as an IDC may be 30% more than the number of CPU cores the IDC actually holds at the time. Numbers are used as examples for the sake of description, rather than limiting the application to such numbers. Moreover, providing may be based on power management, which is discussed as follows.

FIG. 1 illustrates an example block diagram of a system 100 for power management. An example of the system 100 may be an IDC, which is used as an example of a variety of different systems that can provide resources/services for the sake of description, rather than limiting the application to the IDC. The user may be, but not limited to, a party who purchases resources/services, such as a company, an institution, an organization, a household, an individual, and the like.

Resources/devices 102 may have power statuses 104. Resources/devices 102 may include but not limited to CPU cores, memories, storage devices, VA/Is, computing nodes, server farms, racks, bandwidth, network devices, containers, processes, etc. The power statuses 104 may be monitored/detected by software, hardware, firmware, or any combination thereof deployed within the resources/devices 102 or remotely.

The power statuses 104 of resources/devices 102 may be collected by the power management mechanism 106. The power statuses 104 may include power consumption information of resources/devices 102 such as CPU cores, servers, memories, storage devices, etc. The power statuses 104 may be monitored/detected by software, hardware, firmware, or any combination thereof deployed within the resources/devices 102 or remotely.

For example, the power consumed by a CPU core may be calculated based on the specification provided by the CPU core manufacture. Also, the CPU core may be tested or measured to collect the data of power consumption. When the CPU core is not running, the CPU core may consume the minimum amount of power, for example, 20 W. When the CPU core is running five applications, the CPU core may consume 120 W. When the CPU core is running ten applications, the CPU core may consume 200 W. Also, other manners may be used to collect power consumption information the CPU core. The power consumption information of servers, memories, storage devices, and other resources may also be collected by testing, statistical data, or any other suitable manners. The power consumption information may be collected periodically, for example, per second, minute, hour, day, etc.

The power management mechanism 106 may quantify the power statuses 104 of resources/devices 102 into power quantities 108. The power quantities 108 may be represented in power units such as Watt or any other suitable metrics.

Quantifying the power statuses 104 may be performed by the power management mechanism 106 by mapping the power consumption information of resources/devices 102 into power units. For example, one power unit for a CPU core may be 1 W. One power unit for a memory may be 0.5 GB. One power unit for a storage may be 10 GB. 5 GB/s bandwidth may be mapped into one power unit. When the CPU core is not running, the CPU core may consume the minimum amount of power, for example, 20 power units. When the CPU core is running five applications, the CPU core may consume 120 power units. When the CPU core is running at its maximum load, for example, ten applications, the CPU core may consume 200 power units. A user request resources, for example, 2 CPU cores, 1 GB of memory, and 100 GB of storage to run applications of the user. The power management mechanism 106 may map such requested resources as 120 power units of CPU cores, 2 power units of memory, and 10 power units of storage. Thus, 132 power units may be the power quantities of the VM requested by the user. Numbers are used as examples for the sake of description, rather than limiting the application to such numbers.

The power management mechanism 106 may provide the power quantities 108 to the platform 110, which may calculate an available soft capacity of the system 100 based on the total capacity of the system 100 and power quantities 108 provided by the power management mechanism 104. The platform 110 may be implemented as any suitable platforms. The total capacity may refer to the total amount of resource that the system may provide, and the available soft capacity may refer to an available amount of resources of the system that is not fixed but changes over time. For example, the total capacity of the system 100 may be 1000 power units, and the power quantities 108 may be 320 power units. In this case, the available soft capacity may be 680 power units. The total capacity of the system may be measured or calculated based on how much resource the system has. For example, the system may have 100 CPU cores, 100 GB of memory, 1000 GB of storage, and 50 GB/s of bandwidth. The total capacity of the system may be mapped into 1000 power units. The available soft capacity of the system 100 may be measured dynamically or periodically, for example, per second, minute, hour, day, week, month, etc. Numbers are used as examples for the sake of description, rather than limiting the application to such numbers.

The platform 110 may provide/sell resources of the system 100 based on the calculated available soft capacity to one or more users. The minimum amount of resources the platform 110 may provide/sell is the available soft capacity. However, the number of users requesting the resource may change from time to time. For example, a user may subscribe service from the system for one month, and may cancel the subscription after one week. Moreover, applications of different users may not run at the same time, meaning that a part of the resources provided/sold to these users may not be actually used. Furthermore, even though a user may lease or purchase a certain amount of resources from the system 100, amounts of resources consumed by a user (i.e., application programs of the user) vary at different time points, which may be much less than the amount of resources that is leased or purchased. Therefore, the platform 110 may provide an assigned amount of resources beyond the calculated available soft capacity of the system 110. For example, the calculated available soft capacity may be 1000 power units. The platform 110 may provide 2000 power units to one or more users. In this case, the percentage of providing is 200%. The percentage of providing may be, but not limited to, 110%, 300%, 400%, 500%, etc. The percentage of providing may be set dynamically or periodically, for example, per second, minute, hour, day, week, month, etc. Numbers are used as examples for the sake of description, rather than limiting the application to such numbers. The amount or percentage of providing may also depend on factors such as quality of service, traffic load and so on.

Figure 2:
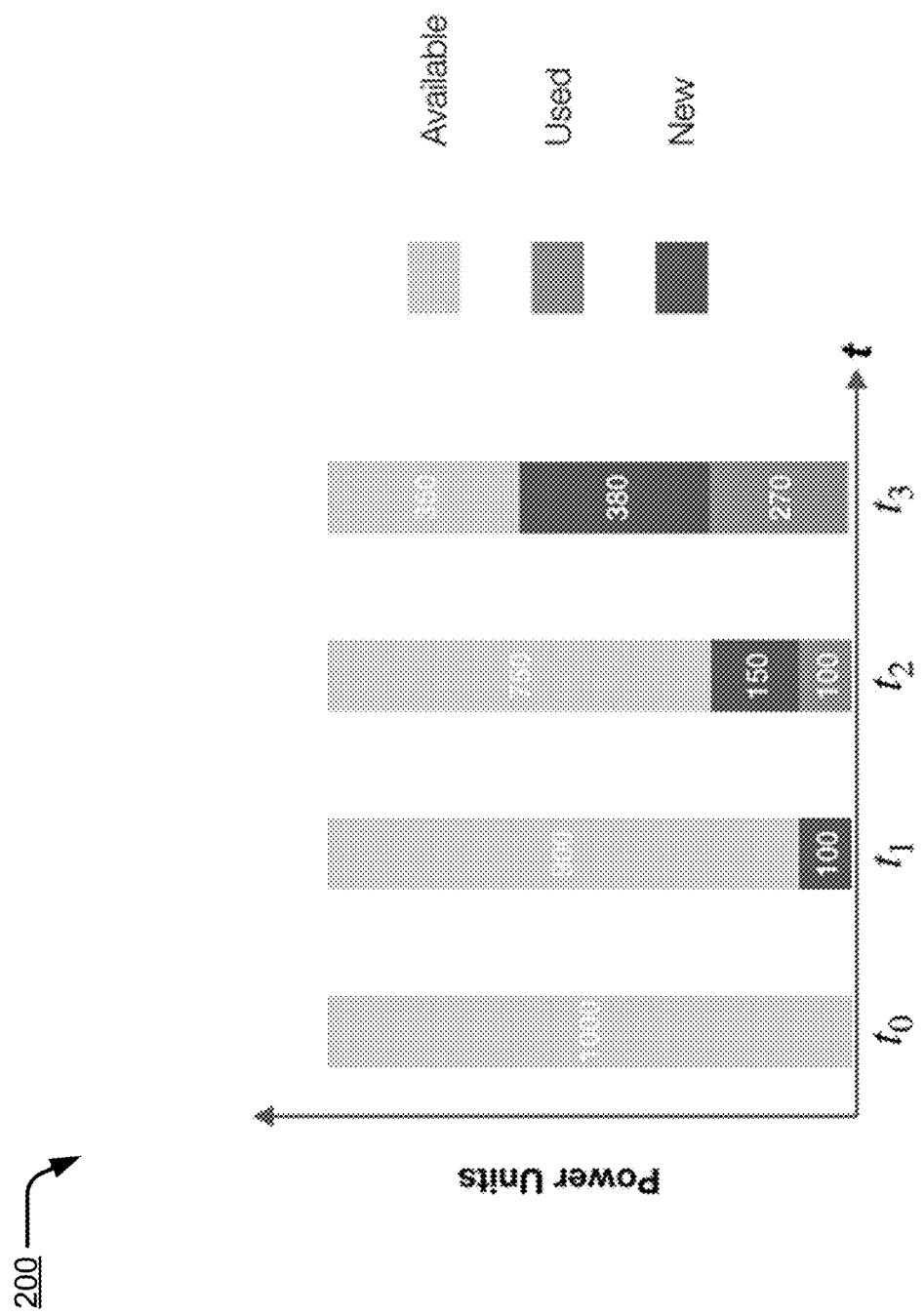
FIG. 2 illustrates an example graph of resource assignment to users.

FIG. 2 illustrates an example graph 200 of resource assignment to users.

Referring to FIG. 2, at time point to, a system which provides resources/services may have a total available soft capacity of 1000 power units. An example of the system may be an IDC, which is used as an example of a variety of different systems that can provide resources/services for the sake of description, rather than limiting the application to the IDC.

At time point $t_1$, a first user may request resources from the system. For example, the first user may request a first amount of resources including a first number of processors, a first amount of memory, a first amount of storage, and/or a first amount of bandwidth (e.g., 2 CPU cores, 1 GB memory, 10 GB storage, and 5 GB/s bandwidth). The system may then allocate the first amount of resources to the first user. The first user may be, but not limited to, a party who purchases resources/services, such as a company, an institution, an organization, a household, an individual, and the like. In response to the first user's request, the system may assign the resources, for example, the first amount of resources which corresponds to a first number of power units, for example, 100 power units, to the first user. After $t_1$, 900 power units of the system may be left available as the soft available capacity. Numbers are used as examples for the sake of description, rather than limiting the application to such numbers.

At time point $t_2$, a second user may request resources from the system. For example, the second user may request a second amount of resources including a second number of processors, a second amount of memory, a second amount of storage, and/or a second amount of bandwidth (e.g., 3 CPU cores, 2 GB of memory, 5 GB of storage, and 10 GB/s of bandwidth. The system may then allocate the second amount of resources to the second user. The second user may be, but not limited to, a party who purchases resources/services, such as a company, an institution, an organization, a household, an individual, and the like. In response to the second user's request, the system may assign the resources, for example, second amount of resources which corresponds to a second number of power units, for example, 150 power units, to the second user. After $t_2$, 750 power units of the system may be left available as the soft available capacity.

At time point $t_3$, a third user may request resources from the system. For example, the third user may request a third amount of resources including a third number of processors, a third amount of memory, a third amount of storage, and/or a third amount of bandwidth (e.g., 4 CPU cores, 4 GB memory, 15 GB storage, and 20 GB/s bandwidth). The system may then allocate the third amount of resources to the third user. The third user may be, but not limited to, a party who purchases resources/services, such as a company, an institution, an organization, a household, an individual, and the like. In response to the third user's request, the system may assign the resources, for example, the third amount of resources which corresponds to a third number of power units, for example, 380 power units, to the third user. After $t_3$, 350 power units of the system may be left available as the soft available capacity.

Figure 3:
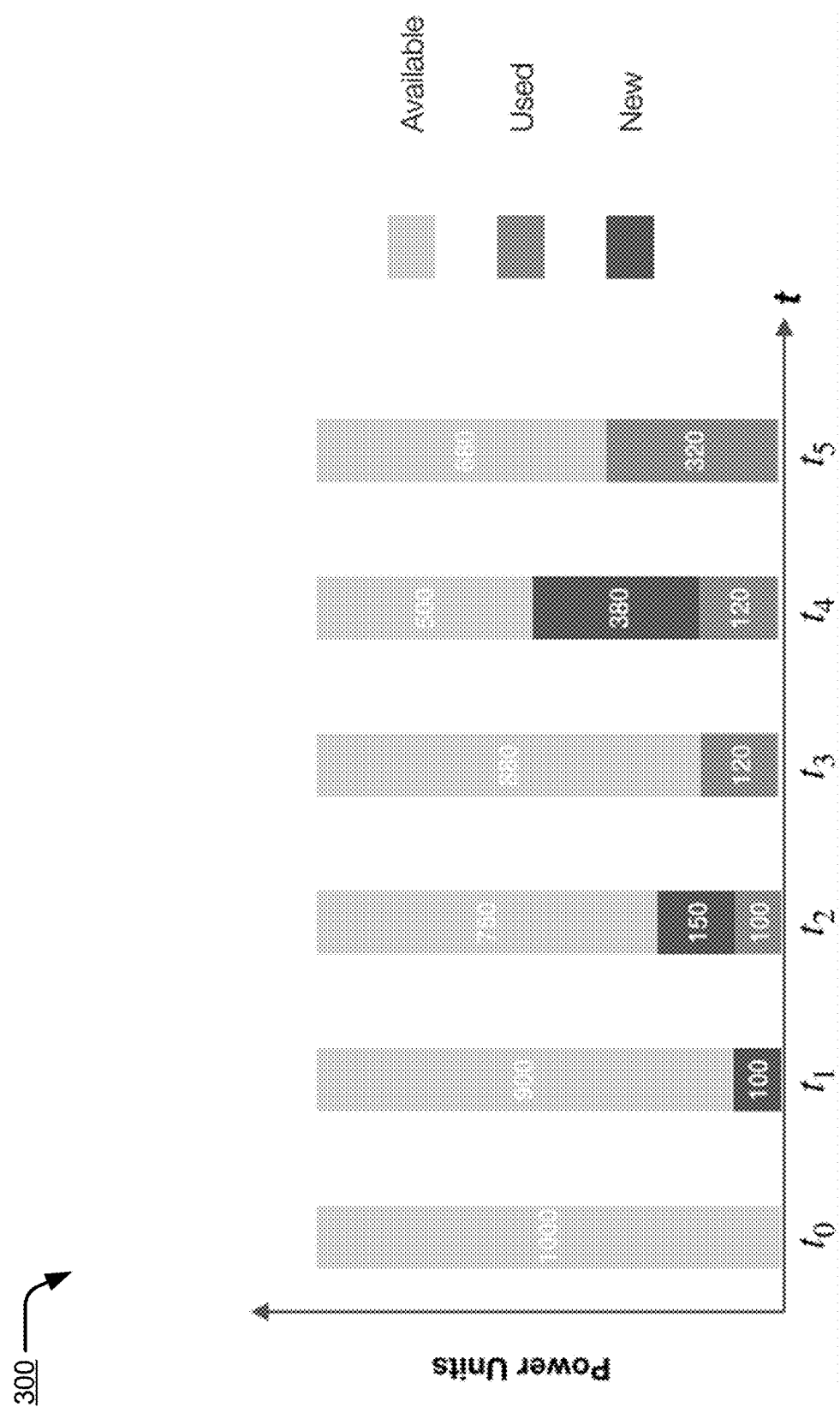
FIG. 3 illustrates an example graph of resource assignment to users with resource consumption adjustments.

FIG. 3 illustrates an example graph 300 of resource assignment to users with resource consumption adjustments.

Referring to FIG. 3, at time point to, a system which provides resources/services may have a total capacity of 1000 power units. An example of the system may be an IDC, which is used as an example of a variety of different systems that can provide resources/services for the sake of description, rather than limiting the application to the IDC.

At time point $t_1$, a first user may request resources from the system. For example, the first user may request a first amount of resources such as 2 CPU cores, 1 GB memory, 10 GB storage, and 5 GB/s bandwidth. In response to the first user's request, the system may assign the first amount of resources, for example, 2 CPU cores, 1 GB memory, 10 GB storage, and 5 GB/s bandwidth which corresponds a first number of power units, for example, 100 power units, to the first user. After $t_1$, 900 power units of the system may be left available as the soft available capacity. Numbers are used as examples for the sake of description, rather than limiting the application to such numbers.

At time point $t_2$, a second user may request resources from the system. For example, the second user may request a second amount of resources, e.g., 3 CPU cores, 2 GB of memory, 5 GB of storage, and 10 GB/s of bandwidth. In response to the second user's request, the system may assign the second amount of resources, for example, 3 CPU cores, 2 GB of memory, 5 GB of storage, and 10 GB/s of bandwidth which corresponds to a second number of power units, for example, 150 power units, to the second user. After $t_2$, 750 power units of the system may be left available as the soft available capacity.

At time point $t_3$, the system may perform a first resource consumption adjustment. A user may only use a portion of the assigned resources, and the actual power consumption may be smaller than the power consumption purchased/leased by the user at the beginning. The first user may actually consume only a part of the assigned resources, for example, 40 power units, and the second user may actually consume only a part of the assigned resources, for example, 80 power units. During the first resource consumption adjustment, at least a part of the resources that is not used by the first or the second user, for example, 60 power units and 70 power units may be returned to the system as part of the available soft capacity. In this case, 130 power units in total may be returned to be available power units of the system due to the first resource consumption adjustment. After $t_3$, 880 power units of the system may be left available as the soft available capacity. The returned power units may come from CPU cores, memories, storages, bandwidth or any combination thereof. Other number of power units may be returned to the system due to the first resource consumption adjustment. Numbers are used as examples for the sake of description, rather than limiting the application to such numbers.

Furthermore, even though some resources are not currently used by a user, the system may not return all of these resources. In that case, if the user increases his/her usage shortly after the adjustment, the resources may still be available to the user.

Additionally, or alternatively, the system may return a portion of a difference between the amount of resources assigned to or purchased by the user and the amount of resources consumed by the user, rather than returning all of the resources that are not consumed by the user to the system. For example, the system may keep 100%, 110%, 120%, etc., of the current power units that are consumed while returning other unused power units. Also, the number of power units that are kept may be less than the number of power units that is assigned to that particular user. In that case, if the user increases his/her usage shortly after the adjustment, at least a part of the resources may still be available to the user.

The first resource consumption adjustment may be performed on resources including but not limited to VMs, CPU cores, memories, storage devices, computing nodes, server farms, racks, bandwidth, network devices, containers, processes, etc. For example, the load of a CPU core may be less than 10%, and the traffic of the user may take 1% of the bandwidth. If a CPU core does not run any application, the CPU may be put into a minimum power state. If an entire VM is not used, the VM may be removed. If a server is not used, the server may hibernate, etc.

At time point $t_4$, a third user may request resources from the system. For example, the third user may request a third amount of resources, e.g., 4 CPU cores, 4 GB memory, 15 GB storage, and 20 GB/s bandwidth. In response to the third user's request, the system may assign the third amount of resources, for example 4 CPU cores, 4 GB memory, 15 GB storage, and 20 GB/s bandwidth which corresponds to a third number of power units, for example, 380 power units, to the third user. After $t_4$, 500 power units of the system may be left available as the soft available capacity. Numbers are used as examples for the sake of description, rather than limiting the application to such numbers.

At time point $t_5$, the system may perform a second resource consumption adjustment. The users may only use a portion of the assigned resources, and the actual power consumption may be smaller than the power consumption purchased/leased by the users at the beginning. The third user may actually consume part of the assigned resources, for example, 180 power units. During the second resource consumption adjustment, at least a part of the resources that is not used by the third user, for example, 200 power units may be returned to the system as part of the available soft capacity. In this case, 200 power units of the third amount of resources assigned to the third user may be returned to be available power units of the system due to the second resource consumption adjustment. After $t_5$, 680 power units of the system may be left available as the soft available capacity. The returned power units may come from CPU cores, memories, storages, bandwidth, or any combination thereof. Other number of power units may be returned to the system due to the second resource consumption adjustment.

Furthermore, even though some resources are not currently used by a user, the system may not return all of these resources. In that case, if the user increases his/her usage shortly after the adjustment, the resources may still be available to the user.

Additionally, or alternatively, the system may return a portion of a difference between the amount of resources assigned to or purchased by the user and the amount of resources consumed by the user, rather than returning all of the resources that are not consumed by the user to the system. For example, the system may keep 100%, 110%, 120%, etc., of the current power units that are consumed while returning other unused power units. Also, the number of power units that are kept may be less than the number of power units that is assigned to that particular user. In that case, if the user increases his/her usage shortly after the adjustment, at least a part of the resources may still be available to the user.

The second resource consumption adjustment may be performed on resources including but not limited to VMs, CPU cores, memories, storage devices, computing nodes, server farms, racks, bandwidth, network devices, containers, processes, etc. For example, the load of a CPU core may be less than 10%, and the traffic of the user may take 1% of the bandwidth. If a CPU core does not run any application, the CPU may be put into a minimum power state. If an entire VM is not used, the VM may be removed. If a server is not used, the server may hibernate, etc.

After the first and second resource consumption adjustments, the resources such as CPU cores, memories, storages, bandwidth or any combination thereof may run the same way as in the previous scenario as shown in FIG. 2 where no resource consumption adjustment is involved. In other words, the first and second resource consumption adjustments may not affect the performance of resources such as CPU cores, memories, storages, bandwidth or any combination thereof. Resources may include but not limited to CPU cores, memories, storage devices, computing nodes, server farms, racks, bandwidth, network devices, containers, processes, etc.

Furthermore, other users may request other resources from the system down the timeline. For example, at time point $t_n$ (not shown), an $n^{th}$ user may request resources from the system, where n is a positive integer. For example, the $n^{th}$ user may request an $n^{th}$ amount of resources including an n number of processors, an $n^{th}$ amount of memory, an $n^{th}$ amount of storage, and/or an $n^{th}$ amount of bandwidth from the system. In response to the $n^{th}$ user's request, the system may assign the $n^{th}$ amount of resources which corresponds to an $n^{th}$ number of power units to the $n^{th}$ user, for example, 100 power units. After $t_n$, a certain number of power units of the system, for example, 500 power units, may be left available as the soft available capacity.

At time point $t_{n+1}$ (not shown), the system may perform an $m^{th}$ resource consumption adjustment, where m is a positive integer. Each user may only use a portion of the assigned resources, and the actual power consumption may be smaller than the power consumption purchased/leased by each user at the beginning. For example, the first user, the second user, the third user, . . . , and the $n^{th}$ user may not consume all the resources assigned to them. During the $m^{th}$ resource consumption adjustment, at least a part of the resources that is not used by the first user, the second user, the third user, . . . , or the $n^{th}$ user may be returned to the system as part of the available soft capacity. The returned power units may come from CPU cores, memories, storages, bandwidth or any combination thereof.

Furthermore, even though some resources are not currently used by a user, the system may not return all of these resources. In that case, if the user increases his/her usage shortly after the adjustment, the resources may still be available to the user.

Additionally, or alternatively, the system may return a portion of a difference between the amount of resources assigned to or purchased by the user and the amount of resources consumed by the user, rather than returning all of the resources that are not consumed by the user to the system. For example, the system may keep 100%, 110%, 120%, etc., of the current power units that are consumed while returning other unused power units. Also, the number of power units that are kept may be less than the number of power units that is assigned to that particular user. In that case, if the user increases his/her usage shortly after the adjustment, at least a part of the resources may still be available to the user.

The $m^{th}$ resource consumption adjustment may be performed on resources including but not limited to VMs, CPU cores, memories, storage devices, computing nodes, server farms, racks, bandwidth, network devices, containers, processes, etc. For example, the load of a CPU core may be less than 10%, and the traffic of the user may take 1% of the bandwidth. If a CPU core does not run any application, the CPU may be put into a minimum power state. If an entire VM is not used, the VM may be removed. If a server is not used, the server may hibernate, etc.

The resource consumption adjustment may be performed periodically, for example, per seconds, minutes, hours, etc. Also, the resource consumption adjustment may be triggered by predetermined conditions, for example, a new request of resources from a user, the assigned amount reaching a certain percentage such as 10%, 20%, 30%, and so on of the soft available capacity, etc. After the first, the second, . . . , the $m^{th}$ resource consumption adjustments, the resources such as such as CPU cores, memories, storages, bandwidth or any combination thereof may run the same way as in a scenario as no resource consumption adjustment is involved. In other words, the first, the second, . . . , the $m^{th}$ resource consumption adjustments may not affect the performance of the resources such as such as CPU cores, memories, storages, bandwidth or any combination thereof. Resources may include but not limited to CPU cores, memories, storage devices, computing nodes, server farms, racks, bandwidth, network devices, containers, processes, etc.

When there is a traffic peak in the system, performance of resources requested by users may be impacted if the resources of the system are over-provided above a certain percentage of the soft available capacity, for example, 600%, 700%, 800%, etc. In that case, the resources of the system may be over provided. In order to keep the performance of resources requested by users, the over-providing should be avoided. The traffic peak may refer to significant spikes of user demand in a certain period, during which the system may experience the traffic peak. For example, from 7 p.m. to midnight of a day, a great number of users may demand resources from the system, and the traffic during such time may increase by a certain percentage, for example, 200%, 300%, 400%, etc. of the average traffic load.

The system may reserve a predetermined amount of buffer sufficient to keep reliable performance of the resources under the traffic peak. A predetermined amount of resources, for example, 5%, 10%, 15%, etc., of the total capacity of the system may be reserved as the buffer. The reserved resources may not be assigned to any user when there is no traffic peak. If the system determines that there is a traffic peak, a predetermined reserved amount of resources may be used as part of the available soft capacity to address the traffic peak. After the traffic peak, the system may reserve the predetermined amount of resources again.

When the assigned amount of resources is greater than or equal to a threshold of percentage of providing, the system may stop assigning resources to a new user. Because the available soft capacity of the system may be dynamic according to the traffic going through the system, the threshold of percentage of providing may be set dynamically or periodically. For example, in a certain period, the system may run a small number of applications and the available soft capacity may be relatively high. In that case, the threshold of percentage of providing in a predetermined amount of time may be set to be relatively high, such as 500%, 600%, 700%, and so on. The predetermined amount of time may be counted in seconds, minutes, hours, days, weeks, months, etc. After the predetermined amount of time, the threshold of percentage of providing may expire and may be set dynamically. For example, in another period, the system may run a large number of applications at the same time, and the soft available capacity of the system may be relatively low. In that case, the threshold of percentage of providing in a predetermined amount of time may be set to be relatively low, such as 110%, 200%, 300%, 400%, and so on. After the predetermined amount of time, the threshold of percentage of providing may expire and may be set dynamically.

The operator/owner of the system may analyze the traffic pattern of the system based on, but not limited to, historical data, statistical data, experiences, expert's suggestions, and so on. For example, historical data may show that during last month, the traffic peak appears in the morning for most of the time. The system may set the threshold of percentage of providing to be relatively low, such as 110%, 200%, 300%, 400%, and so on, for a predetermined amount of time in the morning. For another example, statistical data may show that the traffic is relatively low in the afternoon for most of the time. The system may set the threshold of percentage of providing to be relatively high, such as 500%, 600%, 700%, and so on, for a predetermined amount of time in the afternoon. The predetermined amount of time may be counted in but not limited to seconds, minutes, hours, etc. After the predetermined amount of time, the threshold of percentage of providing may expire and may be set dynamically. The predetermined amount of time may be determined by the owner/operator of the system as necessary.

When a plurality of users requests resources from the system, the system may associate each user with a priority level. The priority level of each user may be determined based on factors such as quality of service, bandwidth, dataflow, the number of power units, and so on, purchased by the user. The system may rank the plurality of users in an ascending order of priory levels, and the system may assign the resources to the plurality of users based on the ascending order of priory levels such that a user with a higher priority level may be assigned the resources before a user with a lower priority level. If a total assigned amount of resources reaches a threshold of percentage of providing at a certain time point, the system may stop assigning the resources to one or more users with the lowest priority levels in the plurality of users. Additionally, or alternatively, one or more users with the lowest priority levels may be assigned with minimal amounts of resources that are enough for running applications or processes of these users at the current time point, or respective amounts of resources that are purchased by these users.

Additionally, or alternatively, a resource-reserved strategy may be applied for premium users who require high performance at any time. For example, the resources assigned to a premium user may not be returned to the system even if the premium user is not using part of the resources. The premium user may refer to a user who purchases the high quality of resources/services.

A monitoring/control mechanism which is capable of learning and adaption may be provided. The monitoring/control mechanism may include but not limited to Artificial Intelligence (AI) techniques, decision trees, or any other suitable techniques. The AI techniques may include but not limited to Convolutional Neural Networks (CNN), Recurrent Neural Networks (RNN), Long Short-Term Memory Networks (LSTM), Reinforcement learning (RL) networks, Machine Learning (ML) networks, Deep Learning (DL) networks, or any combination thereof. The monitoring/control mechanism may be used for but not limited to simulating a load pattern, predicting a traffic pattern, providing instructions/strategies, etc. For example, historical data/statistic data of the traffic of a system may be used to train the monitoring/control mechanism. The trained monitoring/control mechanism may be used to predict the traffic pattern of the system. The trained monitoring/control mechanism may provide instructions/strategies to the system regarding the threshold of percentage of providing. For example, the predicted traffic pattern may show that the traffic peak will appear in the morning. The monitoring/control mechanism system may suggest the system to set the threshold of percentage of providing to be relatively low, such as 110%, 200%, 300%, 400%, and so on, for a predetermined amount of time in the morning. For another example, the predicted traffic pattern may show that the traffic will be relatively low in the afternoon. The monitoring/control mechanism system may suggest the system to set the threshold of percentage of providing to be relatively high, such as 500%, 600%, 700%, and so on, for a predetermined amount of time in the afternoon. The predetermined amount of time may be counted in but not limited to seconds, minutes, hours, etc. After the predetermined amount of time, the threshold of percentage of providing may expire and may be set dynamically. The predetermined amount of time may be determined by the owner/operator of the system as necessary.

With the systems and processes for providing resources based on power management discussed herein, other features may be added with reasonable modifications or alternations. With apparatuses and processes discussed herein, the simplicity and effectiveness of for providing resources based on power management of a system may be improved.

Figure 4A:
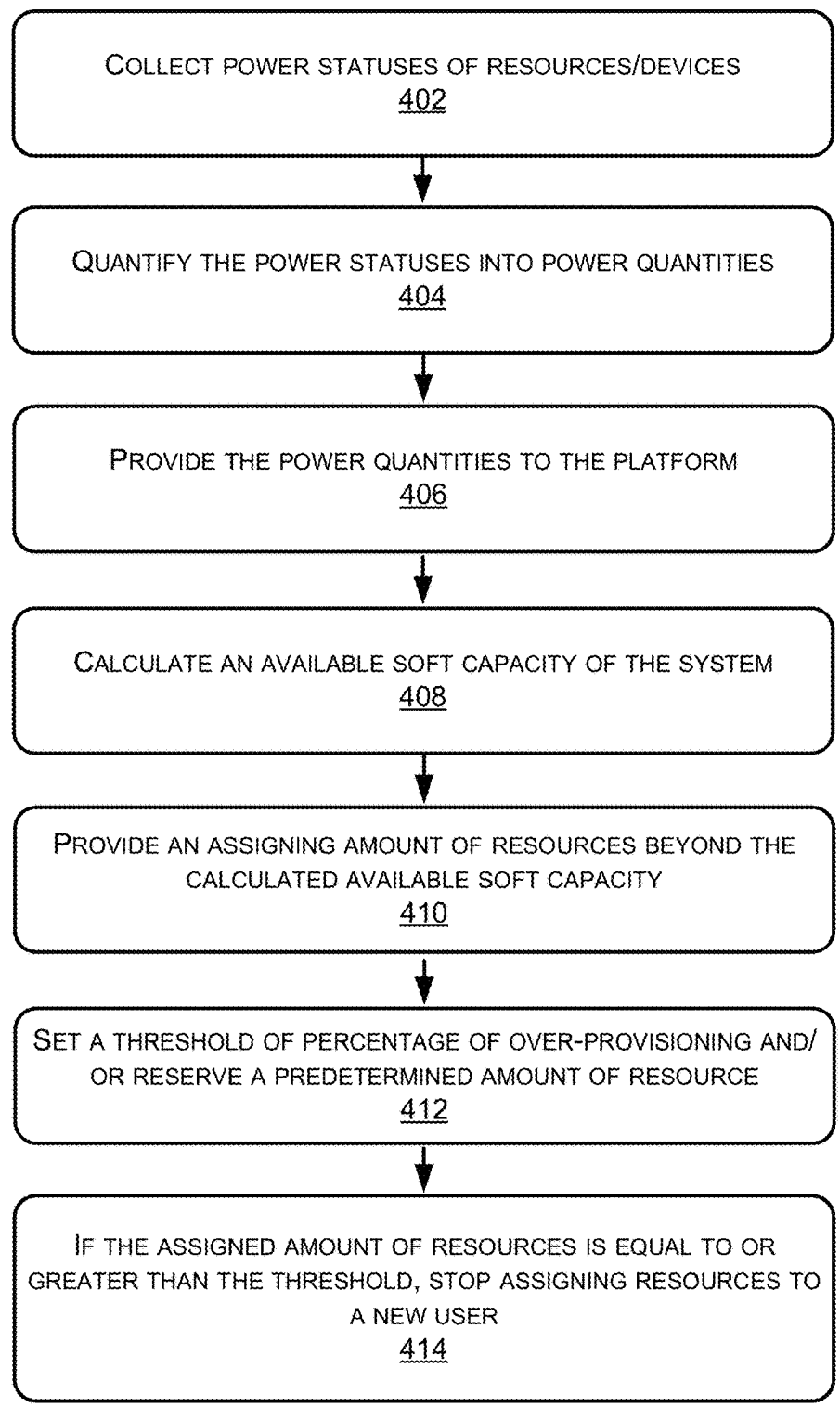
FIGS. 4A, 4B, and 4C illustrate an example flowchart of a process for power management.
Figure 4B:
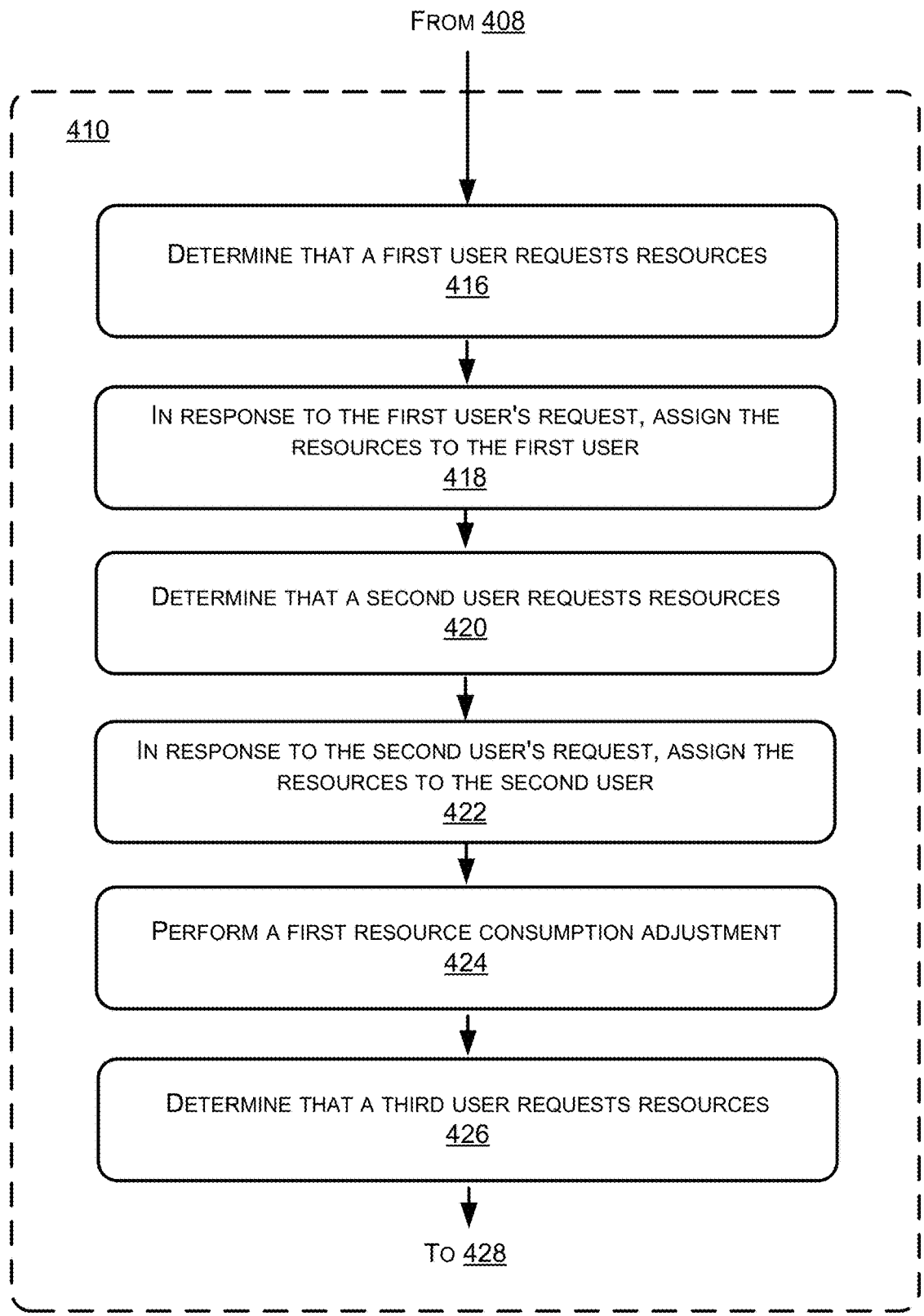
Figure 4C:
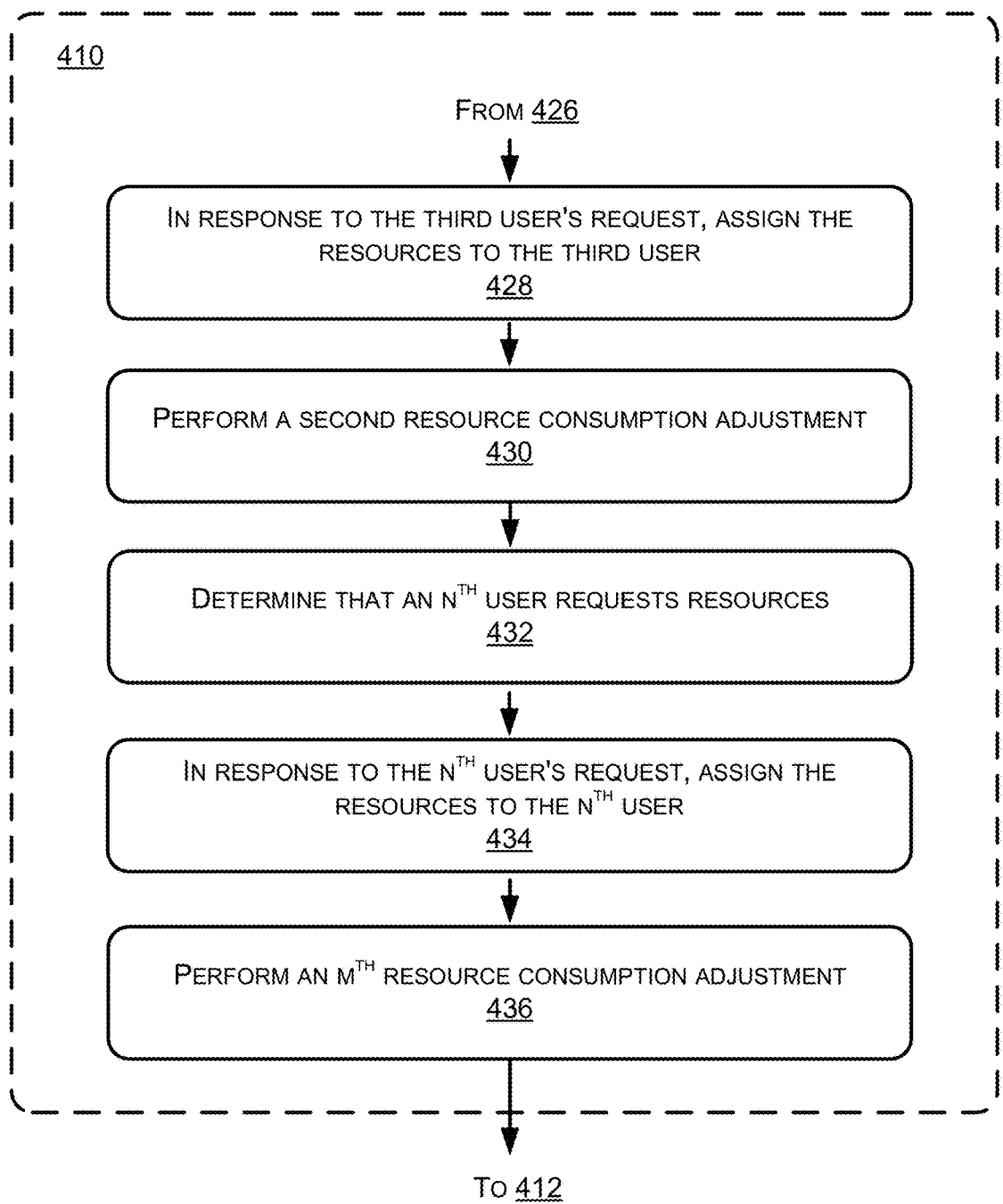

FIGS. 4A, 4B, and 4C illustrate an example flowchart of a process 400 for power management. The process 400 may include the following.

At block 402, power statuses 104 of resources/devices 102 of a system 100 may be collected by the power management mechanism 106 as discussed above with reference to FIG. 1.

At block 404, the power management mechanism 106 may quantify the power statuses 104 of resources/devices 102 into power quantities 108 as discussed above with reference to FIG. 1. The power quantities 108 may be represented in power units such as Watt or any other suitable metrics.

At block 406, the power management mechanism 106 may provide the power quantities 108 to the platform 110, and the platform 110 may calculate an available soft capacity of the system 100 based on the total capacity of the system 100 and power quantities 108 provided by the power management mechanism 104 as discussed above with reference to FIG. 1.

At block 410, the platform 110 may provide an assigned amount of resources beyond the calculated available soft capacity of the system 110. For example, the calculated available soft capacity may be 1000 power units. The platform 110 may provide 2000 power units to one or more users. In this case, the percentage of providing is 200%. The percentage of providing may be, but not limited to, 110%, 300%, 400%, 500%, etc. The percentage of providing may be set dynamically or periodically, for example, per second, minute, hour, day, week, month, etc. The amount or percentage of providing may also depend on factors such as quality of service, traffic load, and so on.

At block 412, the system may set a threshold of percentage of providing as discussed above with reference to FIG. 1. At block 414, if the assigned amount of resources is greater than or equal to the threshold of percentage of providing, the system may stop assigning resources to a new user.

Referring to FIGS. 4B and 4C, detailed process of block 410 is illustrated.

At block 416, at time point $t_1$, the system may determine that a first user requests resources from the system as discussed above with reference to FIGS. 2 and 3. For example, the first user may request a first amount of resources including a first number of processors, a first amount of memory, a first amount of storage, and/or a first amount of bandwidth (e.g., 2 CPU cores, 1 GB memory, 10 GB storage, and 5 GB/s bandwidth). The system may then allocate the first amount of resources to the first user. The first user may be, but not limited to, a party who purchases resources/services, such as a company, an institution, an organization, a household, an individual, and the like.

At block 418, in response to the first user's request, the system may assign the resources to the first user as discussed above with reference to FIGS. 2 and 3. For example, the system may assign the first amount of resources corresponding to a first number of power units, such as 100 power units, to the first user. After $t_1$, 900 power units of the system may be left available as the soft available capacity.

At block 420, at time point $t_2$, the system may determine that a second user requests resources from the system. For example, the second user may request a second amount of resources, and the system may then allocate the second amount of resources to the second user as discussed above with reference to FIGS. 2 and 3. The second user may be, but not limited to, a party who purchases resources/services, such as a company, an institution, an organization, a household, an individual, and the like.

At block 422, in response to the second user's request, the system may assign the resources to the second user as discussed above with reference to FIGS. 2 and 3.

At block 424, the system may perform a first resource consumption adjustment at time point $t_3$ as discussed above with reference to FIGS. 2 and 3. Furthermore, even though some resources are not currently used by a user, the system may not return all of these resources. In that case, if the user increases his/her usage shortly after the adjustment, the resources may still be available to the user.

At block 426, at time point $t_4$, the system may determine that a third user requests resources from the system as discussed above with reference to FIG. 3.

At block 428, in response to the third user's request, the system may assign the resources, for example, the third amount of resources to the third user.

At block 430, at time point $t_5$, the system may perform a second resource consumption adjustment as discussed above with reference to FIG. 3. The users may only use a portion of the assigned resources, and the actual power consumption may be smaller than the power consumption purchased/leased by the users at the beginning. Furthermore, even though some resources are not currently used by the user(s), the system may not return all of these resources. In that case, if the user(s) increases his/her usage shortly after the adjustment, the resources may still be available to the user(s).

Additionally, or alternatively, the system may return a portion of a difference between the amount of resources assigned to or purchased by the user and the amount of resources consumed by the user, rather than returning all of the resources that are not consumed by the user to the system. The second resource consumption adjustment may be performed on resources as discussed above with reference to FIG. 3.

After the first and second resource consumption adjustments, the resources such as CPU cores, memories, storages, bandwidth or any combination thereof may run the same way as in the previous scenario as shown in FIG. 2 where no resource consumption adjustment is involved. In other words, the first and second resource consumption adjustments may not affect the performance of resources such as CPU cores, memories, storages, bandwidth or any combination thereof. Resources may include but not limited to CPU cores, memories, storage devices, computing nodes, server farms, racks, bandwidth, network devices, containers, process, etc.

At block 432, at time point $t_n$, the system may determine that an $n^{th}$ user requests resources from the system, where n is a positive integer. For example, the $n^{th}$ user may request an $n^{th}$ amount of resources including an n number of processors, an $n^{th}$ amount of memory, an $n^{th}$ amount of storage, and/or an $n^{th}$ amount of bandwidth from the system.

At block 434, in response to the $n^{th}$ user's request, the system may assign the $n^{th}$ amount of resources which corresponds to an $n^{th}$ number of power units, for example, 100 power units to the $n^{th}$ user. After $t_n$, a certain number of power units of the system, for example, 500 power units, may be left available as the soft available capacity. Numbers are used as examples for the sake of description, rather than limiting the application to such numbers.

At block 436, at a time point $t_{n+1}$, the system may perform an $m^{th}$ resource consumption adjustment, where m is a positive integer. Each user may only use a portion of the assigned resources, and the actual power consumption may be smaller than the power consumption purchased/leased by the user at the beginning. For example, the first user, the second user, the third user, . . . , and the $n^{th}$ user may not consume all the resources assigned to them. During the $m^{th}$ resource consumption adjustment, at least a part of the resources that is not used by the first user, the second user, the third user, . . . , or the $n^{th}$ user may be returned to the system as part of the available soft capacity. Furthermore, even though some resources are not currently used by a user, the system may not return all of these resources. In that case, if the user increases his/her usage shortly after the adjustment, the resources may still be available to the user.

Additionally, or alternatively, the system may return a portion of a difference between the amount of resources assigned to or purchased by the user and the amount of resources consumed by the user, rather than returning all of the resources that are not consumed by the user to the system. The number of power units that are kept may be less than the number of power units that is assigned to that particular user. In that case, if the user increases his/her usage shortly after the adjustment, at least a part of the resources may still be available to the user.

The $m^{th}$ resource consumption adjustment may be performed on resources including but not limited to VMs, CPU cores, memories, storage devices, computing nodes, server farms, racks, bandwidth, network devices, containers, processes, etc. For example, the load of a CPU core may be less than 10%, and the traffic of the user may take 1% of the bandwidth. If a CPU core does not run any application, the CPU may be put into a minimum power state. If an entire VM is not used, the VM may be removed. If a server is not used, the server may hibernate, etc. Numbers are used as examples for the sake of description, rather than limiting the application to such numbers.

The resource consumption adjustment may be performed periodically, for example, per seconds, minutes, hours, etc. Also, the resource consumption adjustment may be triggered by predetermined conditions, for example, a new request of resources from a user, the assigned amount reaching a certain percentage such as 10%, 20%, 30%, and so on of the soft available capacity, etc. After the first, the second, . . . , the $m^{th}$ resource consumption adjustments, the resources such as such as CPU cores, memories, storages, bandwidth or any combination thereof may run the same way as in a scenario as no resource consumption adjustment is involved. In other words, the first, the second, . . . , the $m^{th}$ resource consumption adjustments may not affect the performance of the resources such as such as CPU cores, memories, storages, bandwidth or any combination thereof. Resources may include but not limited to CPU cores, memories, storage devices, computing nodes, server farms, racks, bandwidth, network devices, containers, processes, etc.

Figure 5A:
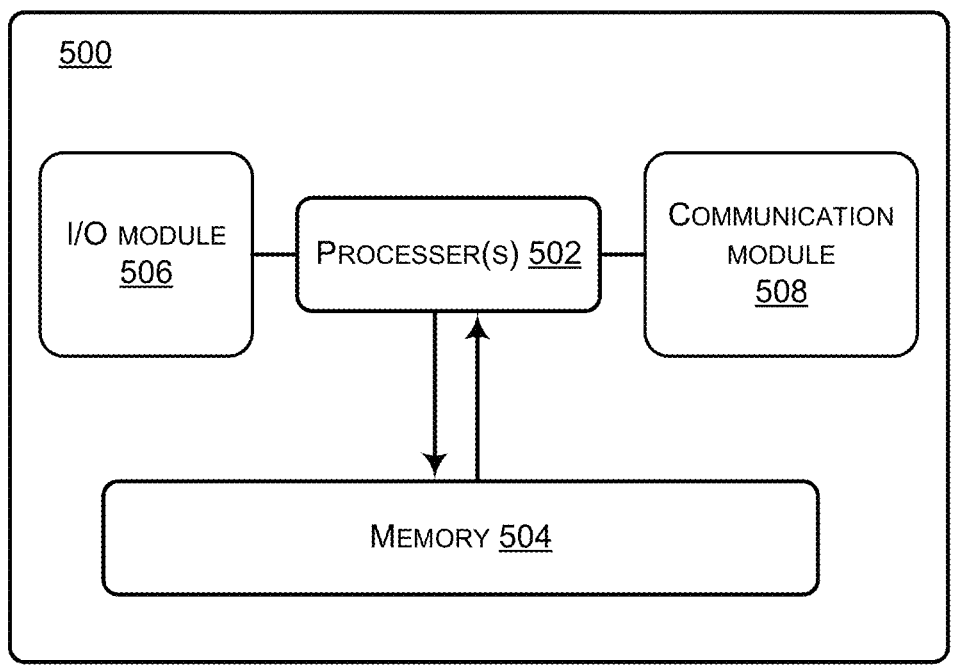
FIGS. 5A and 5B illustrate an example diagram of an apparatus for implementing the systems and processes described with reference to FIGS. 1-4.
Figure 5B:
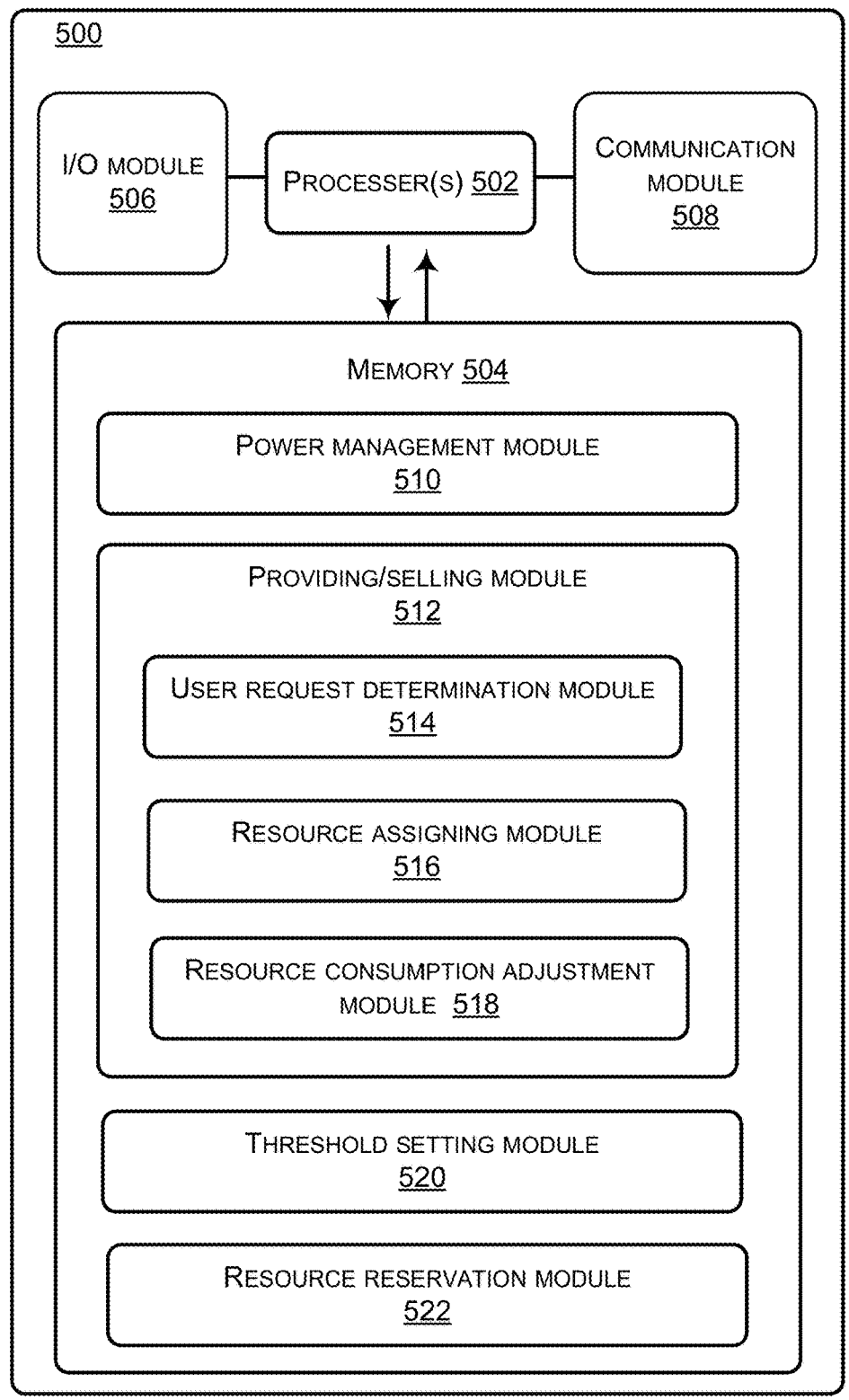

FIGS. 5A and 5B illustrate an example diagram of an apparatus 500 for implementing the systems and processes described with reference to FIGS. 1-4.

FIGS. 5A and 5B only show one example of an apparatus 500 and are not intended to suggest any limitation as to the scope of use or functionality of any computing device utilized to perform the processes and/or procedures described above. Other well-known computing devices, apparatuses, environments and/or configurations that may be suitable for use with the embodiments include, but are not limited to, driver/passenger computers, server computers, hand-held or laptop devices, multiprocessor apparatuses, microprocessor-based apparatuses, set-top boxes, game consoles, programmable consumer electronics, network PCs, minicomputers, mainframe computers, distributed computing environments that include any of the above apparatuses or devices, implementations using field programmable gate arrays ("FPGAs") and application specific integrated circuits ("ASICs"), and/or the like.

The apparatus 500 may include one or more processors 502 and memory 504 communicatively coupled to the processor(s) 502. The processor(s) 502 may execute one or more modules and/or processes to cause the processor(s) 502 to perform a variety of functions. In some embodiments, the processor(s) 502 may include a central processing unit (CPU), a graphics processing unit (GPU), both CPU and GPU, or other processing units or components known in the art. Additionally, each of the processor(s) 502 may possess its own local memory, which also may store program modules, program data, and/or one or more operating apparatuses.

Depending on the exact configuration and type of the apparatus 500, the memory 504 may be volatile, such as RAM, non-volatile, such as ROM, flash memory, miniature hard drive, memory card, and the like, or some combination thereof. The memory 504 may include computer-executable modules that are executable by the processor(s) 502, when executed by the processor(s) 502, cause the processor(s) 502 to implement systems and processes described with reference to FIGS. 1-4.

The apparatus 500 may additionally include an input/output (I/O) interface 506 for receiving and outputting data. The apparatus 500 may also include a communication module 508 allowing the apparatus 500 to communicate with other devices (not shown) over a network (not shown). The network may include the Internet, wired media such as a wired network or direct-wired connections, and wireless media such as acoustic, radio frequency (RF), infrared, and other wireless media.

Referring to FIG. 5B, modules stored in the memory 504 may include the following.

A power management module 510 may be configured to collect power statuses 104 of resources/devices 102 of a system 100 as discussed above with reference to FIG. 1. The resource providing system (system) 100 may be able to provide resources/services to users. An example of the system 100 may be an IDC, which is used as an example of a variety of different systems that can provide resources/services for the sake of description, rather than limiting the application to the IDC. The user may be, but not limited to, a party who purchases resources/services, such as a company, an institution, an organization, a household, an individual, and the like. Resources/devices 102 may have power statuses 104. Resources/devices 102 may include but not limited to CPU cores, memories, storage devices, VMs, computing nodes, server farms, racks, bandwidth, network devices, containers, process, etc.

The power statuses 104 may include power consumption information of resources/devices 102 such as CPU cores, servers, memories, storage devices, etc. For example, the power consumed by a CPU core may be calculated based on the specification provided by the CPU core manufacture. Also, the CPU core may be tested or measured to collect the data of power consumption. When the CPU core is not running, the CPU core may consume the minimum amount of power, for example, 20 W. When the CPU core is running five applications, the CPU core may consume 120 W. When the CPU core is running ten applications, the CPU core may consume 200 W. Also, other manners may be used to collect power consumption information the CPU core. The power consumption information of servers, memories, storage devices, and other resources may also be collected by testing, statistics data, or any other suitable manners. The power consumption information may be collected periodically, for example, per second, minute, hour, day, etc.

The power management module 510 may be further configured to quantify the power statuses 104 of resources/devices 102 into power quantities 108. The power quantities 108 may be represented in power units such as Watt or any other suitable metrics. Quantifying the power statuses 104 may be performed by the power management module 510 by mapping the power consumption information of resources/devices 102 into power units. For example, one power unit for a CPU core may be 1 W. One power unit for a memory may be 0.5 GB. One power unit for a storage may be 10 GB. 5 GB/s bandwidth may be mapped into one power unit. When the CPU core is not running, the CPU core may consume the minimum amount of power, for example, 20 power units. When the CPU core is running five applications, the CPU core may consume 120 power units. When the CPU core is running at its maximum load, for example, ten applications, the CPU core may consume 200 power units. A user may request resources, for example, 2 CPU cores, 1 GB of memory, and 100 GB of storage to run five applications. The power management module 510 may map such a VM into 120 power units of CPU cores, 2 power units of memory, and 10 power units of storage. Thus, 132 power units may be the power quantities of the VM requested by the user. Numbers are used as examples for the sake of description, rather than limiting the application to such numbers.

A providing/selling module 512 may be configured to receive the power quantities 108 from the power management module 510, and to calculate an available soft capacity of the system 100 based on total capacity of the system 100 and power quantities 108 provided by the power management module 510. The providing/selling module 512 may be implemented as any suitable platforms. For example, the total capacity of the system 100 may be 1000 power units. The power quantities 108 may be 320 power units. In this case, the available soft capacity may be 680 power units. The total capacity may refer to the total amount of resource that the system may provide. The total capacity of the system may be measured or calculated based on how much resource the system has. For example, the system may have 100 CPU cores, 100 GB of memory, 1000 GB of storage, and 50 GB/s of bandwidth. The total capacity of the system may be mapped into 1000 power units. The available soft capacity may refer to an available amount of resources of the system that is not fixed but changes over time. The available soft capacity of the system 100 may be measured in dynamically or periodically, for example, per second, minute, hour, day, week, month, etc. Numbers are used as examples for the sake of description, rather than limiting the application to such numbers.

The providing/selling module 512 may be further configured to provide/sell resources of the system 100 based on the calculated available soft capacity to one or more users as discussed above with reference to FIGS. 1-4. The minimum amount of resources the providing/selling module 512 may provide/sell is the available soft capacity. However, the number of users requesting the resource may change from time to time. For example, a user may subscribe service from the system for one month, and may cancel the subscription after one week. Moreover, applications of different users may not run at the same time, meaning that part of the resources provided/sold to these users may not be actually used. Furthermore, even though a user may lease or purchase a certain amount of resources from the system 100, amounts of resources consumed by a user (i.e., application programs of the user) vary at different time points, which may be much less than the amount of resources that is leased or purchased. Therefore, the providing/selling module 512 may provide an assigned amount of resources beyond the calculated available soft capacity of the system 110. For example, the calculated available soft capacity may be 1000 power units. The providing/selling module 512 may provide 2000 power units to one or more users. In this case, the percentage of providing is 200%. The percentage of providing may be, but not limited to, 110%, 300%, 400%, 500%, etc. The percentage of providing may be set dynamically or periodically, for example, per second, minute, hour, day, week, month, etc. Numbers are used as examples for the sake of description, rather than limiting the application to such numbers. The amount or percentage of providing may also depend on factors such as quality of service, traffic load and so on.

The providing/selling module 512 may include the following.

A user request determination module 514 may be configured to determine that at time point $t_1$, a first user requests resources from the system as discussed above with reference to FIG. 2. For example, the first user may request a first amount of resources including a first number of processors, a first amount of memory, a first amount of storage, and/or a first amount of bandwidth (e.g., 2 CPU cores, 1 GB memory, 10 GB storage, and 5 GB/s bandwidth). The system may then allocate the first amount of resources to the first user. The first user may be, but not limited to, a party who purchases resources/services, such as a company, an institution, an organization, a household, an individual, and the like.

A resource assigning module 516 may be configured to in response to the first user's request, assign the resources, for example, the first amount of resources which corresponds to a first number of power units, for example, 100 power units, to the first user. After $t_1$, 900 power units of the system may be left available as the soft available capacity. Numbers are used as examples for the sake of description, rather than limiting the application to such numbers.

The user request determination module 514 may be further configured to determine that at time point $t_2$, a second user requests resources from the system as discussed above with reference to FIG. 2. For example, the second user may request a second amount of resources including a second number of processors, a second amount of memory, a second amount of storage, and/or a second amount of bandwidth (e.g., 3 CPU cores, 2 GB of memory, 5 GB of storage, and 10 GB/s of bandwidth. The second user may be, but not limited to, a party who purchases resources/services, such as a company, an institution, an organization, a household, an individual, and the like.

The resource assigning module 516 may be further configured to in response to the second user's request, assign the resources, for example, second amount of resources which corresponds to a second number of power units, for example, 150 power units, to the second user. After $t_2$, 750 power units of the system may be left available as the soft available capacity.

A resource consumption adjustment module 518 may be configured to perform a first resource consumption adjustment. A user may only use a portion of the assigned resources, and the actual power consumption may be smaller than the power consumption purchased/leased by the user at the beginning. The first user may actually consume only a part of the assigned resources, for example, 40 power units, and the second user may actually consume only a part of the assigned resources, for example, 80 power units. During the first resource consumption adjustment, at least a part of the resources that is not used by the first or the second user, for example, 60 power units and 70 power units may be returned to the system as part of the available soft capacity. In this case, 130 power units in total may be returned to be available power units of the system due to the first resource consumption adjustment. After $t_3$, 880 power units of the system may be left available as the soft available capacity. The returned power units may come from CPU cores, memories, storages, bandwidth or any combination thereof. Other number of power units may be returned to the system due to the first resource consumption adjustment. Numbers are used as examples for the sake of description, rather than limiting the application to such numbers.

Furthermore, even though some resources are not currently used by a user, the system may not return all of these resources. In that case, if the user increases his/her usage shortly after the adjustment, the resources may still be available to the user.

Additionally, or alternatively, the system may return a portion of a difference between the amount of resources assigned to or purchased by the user and the amount of resources consumed by the user, rather than returning all of the resources that are not consumed by the user to the system. For example, the system may keep 100%, 110%, 120%, etc., of the current power units that are consumed while returning other unused power units. Also, the number of power units that are kept may be less than the number of power units that is assigned to that particular user. In that case, if the user increases his/her usage shortly after the adjustment, at least a part of the resources may still be available to the user.

The first resource consumption adjustment may be performed on resources including but not limited to VMs, CPU cores, memories, storage devices, computing nodes, server farms, racks, bandwidth, network devices, containers, process, etc. For example, the load of a CPU core may be less than 10%, and the traffic of the user may take 1% of the bandwidth. If a CPU core does not run any application, the CPU may be put into a minimum power state. If an entire VM is not used, the VM may be removed. If a server is not used, the server may hibernate, etc. Numbers are used as examples for the sake of description, rather than limiting the application to such numbers.

The user request determination module 514 may be further configured at time point $t_4$, determine that a third user requests resources from the system as discussed above with reference to FIG. 3. For example, the third user may request a third amount of resources including a third number of processors, a third amount of memory, a third amount of storage, and/or a third amount of bandwidth (e.g., 4 CPU cores, 4 GB memory, 15 GB storage, and 20 GB/s bandwidth). The third user may be, but not limited to, a party who purchases resources/services, such as a company, an institution, an organization, a household, an individual, and the like.

The resource assigning module 516 may be further configured to in response to the third user's request, assign the resources, for example, the third amount of resources which corresponds to a third number of power units, for example, 380 power units, to the third user. After $t_3$, 350 power units of the system may be left available as the soft available capacity.

The resource consumption adjustment module 518 may be further configured to at time point $t_5$, perform a second resource consumption adjustment as discussed above with reference to FIG. 3. The user may only use a small part of the assigned resources, and the actual power consumption may be smaller than the power consumption purchased/leased by the user at the beginning. The third user may actually consume part of the assigned resources, for example, 180 power units. During the second resource consumption adjustment, at least a part of the resources that is not used by the third user, for example, 200 power units may be returned to the system as part of the available soft capacity. In this case, 200 power units of the third amount of resources assigned to the third user may be returned to be available power units of the system due to the second resource consumption adjustment. After $t_5$, 680 power units of the system may be left available as the soft available capacity. The returned power units may come from CPU cores, memories, storages, bandwidth, or any combination thereof. Other number of power units may be returned to the system due to the second resource consumption adjustment. Numbers are used as examples for the sake of description, rather than limiting the application to such numbers.

Furthermore, even though some resources are not currently used by a user, the system may not return all of these resources. In that case, if the user increases his/her usage shortly after the adjustment, the resources may still be available to the user.

Additionally, or alternatively, the system may return a portion of a difference between the amount of resources assigned to or purchased by the user and the amount of resources consumed by the user, rather than returning all of the resources that are not consumed by the user to the system. For example, the system may keep 100%, 110%, 120%, etc., of the current power units that are consumed while returning other unused power units. Also, the number of power units that are kept may be less than the number of power units that is assigned to that particular user. In that case, if the user increases his/her usage shortly after the adjustment, at least a part of the resources may still be available to the user.

The second resource consumption adjustment may be performed on resources including but not limited to VMs, CPU cores, memories, storage devices, computing nodes, server farms, racks, bandwidth, network devices, containers, process, etc. For example, the load of a CPU core may be less than 10%, and the traffic of the user may take 1% of the bandwidth. If a CPU core does not run any application, the CPU may be put into a minimum power state. If an entire VM is not used, the VM may be removed. If a server is not used, the server may hibernate, etc. Numbers are used as examples for the sake of description, rather than limiting the application to such numbers.

After the first and second resource consumption adjustments, the resources such as CPU cores, memories, storages, bandwidth or any combination thereof may run the same way as in the previous scenario as shown in FIG. 2 where no resource consumption adjustment is involved. In other words, the first and second resource consumption adjustments may not affect the performance of resources such as CPU cores, memories, storages, bandwidth or any combination thereof. Resources may include but not limited to CPU cores, memories, storage devices, computing nodes, server farms, racks, bandwidth, network devices, containers, process, etc.

The user request determination module 514 may be further configured to at time point $t_n$, determine that an $n^{th}$ user requests resources from the system, where n is a positive integer. For example, the $n^{th}$ user may request an $n^{th}$ amount of resources including an n number of processors, an $n^{th}$ amount of memory, an $n^{th}$ amount of storage, and/or an $n^{th}$ amount of bandwidth from the system.

The resource assigning module 516 may be further configured to in response to the $n^{th}$ user's request, assign the $n^{th}$ amount of resources which corresponds to an $n^{th}$ number of power units, for example, 100 power units to the $n^{th}$ user. After $t_n$, a certain number of power units of the system, for example, 500 power units, may be left available as the soft available capacity.

The resource consumption adjustment module 518 may be further configured to at a time point perform an $m^{th}$ resource consumption adjustment, where m is a positive integer. Each user may only use a small part of the assigned resources, and the actual power consumption may be smaller than the power consumption purchased/leased by the user at the beginning. For example, the first user, the second user, the third user, . . . , and the $n^{th}$ user may not consume all the resources assigned to them. During the $m^{th}$ resource consumption adjustment, at least a part of the resources that is not used by the first user, the second user, the third user, . . . , or the $n^{th}$ user may be returned to the system as part of the available soft capacity. The returned power units may come from CPU cores, memories, storages, bandwidth or any combination thereof.

Furthermore, even though some resources are not currently used by a user, the system may not return all of these resources. In that case, if the user increases his/her usage shortly after the adjustment, the resources may still be available to the user.

Additionally, or alternatively, the system may return a portion of a difference between the amount of resources assigned to or purchased by the user and the amount of resources consumed by the user, rather than returning all of the resources that are not consumed by the user to the system. For example, the system may keep 100%, 110%, 120%, etc., of the current power units that are consumed while returning other unused power units. Also, the number of power units that are kept may be less than the number of power units that is assigned to that particular user. In that case, if the user increases his/her usage shortly after the adjustment, at least a part of the resources may still be available to the user.

The $m^{th}$ resource consumption adjustment may be performed on resources including but not limited to VMs, CPU cores, memories, storage devices, computing nodes, server farms, racks, bandwidth, network devices, containers, process, etc. For example, the load of a CPU core may be less than 10%, and the traffic of the user may take 1% of the bandwidth. If a CPU core does not run any application, the CPU may be put into a minimum power state. If an entire VM is not used, the VM may be removed. If a server is not used, the server may hibernate, etc. Numbers are used as examples for the sake of description, rather than limiting the application to such numbers.

The resource consumption adjustment may be performed periodically, for example, per seconds, minutes, hours, etc. Also, the resource consumption adjustment may be triggered by predetermined conditions, for example, a new request of resources from a user, the assigned amount reaching a certain percentage such as 10%, 20%, 30%, and so on of the soft available capacity, etc. After the first, the second, . . . , the $m^{th}$ resource consumption adjustments, the resources such as such as CPU cores, memories, storages, bandwidth or any combination thereof may run the same way as in a scenario as no resource consumption adjustment is involved. In other words, the first, the second, . . . , the $m^{th}$ resource consumption adjustments may not affect the performance of the resources such as such as CPU cores, memories, storages, bandwidth or any combination thereof. Resources may include but not limited to CPU cores, memories, storage devices, computing nodes, server farms, racks, bandwidth, network devices, containers, processes, etc.

The memory 504 may further include a threshold setting module 520 and/or a resource reservation module 522.

The threshold setting module 520 may be configured to set a threshold of percentage of providing. Because the available soft capacity of the system may be dynamic according to the traffic going through the system, the threshold of percentage of providing may be set dynamically or periodically. For example, in a certain period, the system may run a small number of applications and the available soft capacity may be relatively high. In that case, the threshold of percentage of providing in a predetermined amount of time may be set to be relatively high, such as 500%, 600%, 700%, and so on. The predetermined amount of time may be counted in but not limited to seconds, minutes, hours, days, weeks, months, etc. After the predetermined amount of time, the threshold of percentage of providing may expire and may be set dynamically. For example, in another period, the system may run a large number of applications at the same time, and the soft available capacity of the system may be relatively low. In that case, the threshold of percentage of providing in a predetermined amount of time may be set to be relatively low, such as 110%, 200%, 300%, 400%, and so on. The predetermined amount of time may be counted in but not limited to seconds, minutes, hours, days, weeks, months, etc. After the predetermined amount of time, the threshold of percentage of providing may expire and may be set dynamically. Numbers are used as examples for the sake of description, rather than limiting the application to such numbers.

The threshold of percentage of providing may be set according to the traffic pattern of the system based on but not limited to historical data, statistical data, experiences, expert's suggestions, and so on. For example, historical data may show that during last month, the traffic peak appears in the morning for most of the time. The system may set the threshold of percentage of providing to be relatively low, such as 110%, 200%, 300%, 400%, and so on, for a predetermined amount of time in the morning. For another example, statistical data may show that the traffic is relatively low in the afternoon for most of the time. The system may set the threshold of percentage of providing to be relatively high, such as 500%, 600%, 700%, and so on, for a predetermined amount of time in the afternoon. The predetermined amount of time may be counted in but not limited to seconds, minutes, hours, etc. After the predetermined amount of time, the threshold of percentage of providing may expire and may be set dynamically. The predetermined amount of time may be determined by the owner/operator of the system as necessary. Numbers are used as examples for the sake of description, rather than limiting the application to such numbers.

The resource reservation module 522 may be configured to reserve a predetermined amount of buffer sufficient to keep good performance of the resources under the traffic peak, which may refer to significant spikes of user demand in a certain period. For example, a predetermined amount of resources, such as, 5%, 10%, 15%, etc., of the total capacity of the system may be reserved to address the traffic peak. The predetermined reserved amount of resources may not be assigned to any user when there is no traffic peak. If the system determines that there is a traffic peak, the predetermined reserved amount of resources may be used as part of the available soft capacity to address the traffic peak. After the traffic peak, the system may reserve the predetermined amount of resources again.

With the systems and processes discussed herein may provide a new perspective process for providing resources based on power management discussed herein, a cloud service system may provide cloud virtual products, serving more cloud applications with fixed limited power. The economic efficiency of the system may be improved. The performance of resources may be the same as the scenario where no providing is involved, and thus users may not be aware of providing happening.

Moreover, the providing based on power management is internal for the system that provides/sells resources. From the user's point of view, the resources they purchased may be measured based on other factors, for example, quality of service, bandwidth, data flow, etc.

Though systems and processes discussed herein set examples of providing resources based on power management, the providing of resources may also be conducted without considering the measurement of power consumption. For example, the providing of resources may be implemented based on variety of factors, such as quality of service, bandwidth, data flow, and so on.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various apparatus configurations, including single-processor or multiprocessor apparatuses, minicomputers, mainframe computers, personal computers, hand-held computing devices, microprocessor-based, programmable consumer electronics, combinations thereof, and the like.

The computer-readable storage media may include volatile memory (such as random-access memory (RAM)) and/or non-volatile memory (such as read-only memory (ROM), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory (PRAM), static random-access memory (SRAM), dynamic random-access memory (DRAM), other types of random-access memory (RANI), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIGS. 1-5. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

EXAMPLE CLAUSES

Clause 1. A method comprising: receiving power statuses of resources of a system, the system capable of providing the resources; quantifying the power statuses of the resources; calculating an available soft capacity of the system based on the quantified power statuses and a total capacity of the system; and providing an assigning amount of the resources beyond the calculated available soft capacity to one or more users.

Clause 2. The method of clause 1, wherein providing the assigning amount of the resources beyond the calculated available soft capacity to one or more users comprises: determining that at least one user of the one or more users requests resources from the system; assigning an amount of resources to the at least one user based on the requested resources; determining that a consumed amount of resources by the at least one user is less than the assigned amount of resources; and returning at least a portion of a difference between the assigned amount of resources and the consumed amount of resources for assigning to other users of the one or more users.

Clause 3. The method of clause 1, further comprising: setting a threshold to resources to be assigned; determining whether the assigned amount of resources is greater than or equal to the threshold; and upon determining that the assigned amount of resources is greater than or equal to the threshold, stopping assigning the resources to a user requesting resources from the system.

Clause 4. The method of clause 3, wherein the threshold is set dynamically or periodically.

Clause 5. The method of clause 1, further comprising reserving a predetermined amount of resources to address a traffic peak.

Clause 6. The method of clause 1, wherein the available soft capacity of the system and the total capacity of the system are represented in power units.

Clause 7. The method of clause 1, wherein the quantified power statuses are represented in power units.

Clause 8. The method of clause 7, wherein the power units are represented in Watt.

Clause 9. A computer-readable storage medium storing computer-readable instructions executable by one or more processors, that when executed by the one or more processors, cause the one or more processors to perform acts comprising: receiving power statuses of resources of a system, the system capable of providing the resources; quantifying the power statuses of the resources; calculating an available soft capacity of the system based on the quantified power statuses and a total capacity of the system; and providing an assigning amount of the resources beyond the calculated available soft capacity to one or more users.

Clause 10. The computer-readable storage medium of clause 9, wherein providing the assigning amount of the resources beyond the calculated available soft capacity to one or more users comprises: determining that at least one user of the one or more users requests resources from the system; assigning an amount of resources to the at least one user based on the requested resources; determining that a consumed amount of resources by the at least one user is less than the assigned amount of resources; and returning at least a portion of a difference between the assigned amount of resources and the consumed amount of resources for assigning to other users of the one or more users.

Clause 11. The computer-readable storage medium of clause 9, wherein the acts further comprise: setting a threshold to resources to be assigned; determining whether the assigned amount of resources is greater than or equal to the threshold; and upon determining that the assigned amount of resources is greater than or equal to the threshold, stopping assigning the resources to a user requesting resources from the system.

Clause 12. The computer-readable storage medium of clause 11, wherein the threshold is set dynamically or periodically.

Clause 13. The computer-readable storage medium of clause 9, wherein the acts further comprise reserving a predetermined amount of resources to address a traffic peak.

Clause 14. The computer-readable storage medium of clause 9, wherein the available soft capacity of the system and the total capacity of the system are represented in power units.

Clause 15. The computer-readable storage medium of clause 9, wherein the quantified power statuses are represented in power units.

Clause 16. The computer-readable storage medium of clause 15, wherein the power unit is Watt.

Clause 17. An apparatus comprising: one or more processors; and a memory communicatively coupled to the one or more processors, the memory storing computer-executable modules executable by the one or more processors, the computer-executable modules including: a power management module configured to collect power statuses of resources of a system, the system capable of providing the resources, the power management module being further configured to quantify the power statuses of the resources; and a providing module configured to calculate an available soft capacity of the system based on the quantified power statuses and a total capacity of the system, and to providing an assigning amount of the resources beyond the calculated available soft capacity to one or more users.

Clause 18. The apparatus of clause 17, wherein the providing module comprises: a user request determination module configured to determine that at least one user of the one or more users requests the resources from the system; a resource assigning module configure to assign an amount of resources to the at least one user based on the requested resources; and a resource consumption adjustment module configured to return at least a portion of a difference between the assigned amount of resources and the consumed amount of resources for assigning to other users of the one or more users.

Clause 19. The apparatus of clause 17, further comprising a threshold setting module configured to set a threshold to resources to be assigned.

Clause 20. The apparatus of clause 17, further comprising a resource reservation module configured to reserve a predetermined amount of resources to address a traffic peak.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
receiving power statuses of resources of a system, the system capable of providing the resources;
quantifying the power statuses of the resources;
calculating an available soft capacity of the system based on the quantified power statuses and a total capacity of the system; and
providing an assigning amount of the resources beyond the calculated available soft capacity to one or more users.

2. The method of claim 1, wherein providing the assigning amount of the resources beyond the calculated available soft capacity to one or more users comprises:
   determining that at least one user of the one or more users requests resources from the system;
   assigning an amount of resources to the at least one user based on the requested resources;
   determining that a consumed amount of resources by the at least one user is less than the assigned amount of resources; and
   returning at least a portion of a difference between the assigned amount of resources and the consumed amount of resources for assigning to other users of the one or more users.

3. The method of claim 1, further comprising:
   setting a threshold to resources to be assigned;
   determining whether the assigned amount of resources is greater than or equal to the threshold; and
   upon determining that the assigned amount of resources is greater than or equal to the threshold, stopping assigning the resources to a user requesting resources from the system.

4. The method of claim 3, wherein the threshold is set dynamically or periodically.

5. The method of claim 1, further comprising reserving a predetermined amount of resources to address a traffic peak.

6. The method of claim 1, wherein the available soft capacity of the system and the total capacity of the system are represented in power units.

7. The method of claim 1, wherein the quantified power statuses are represented in power units.

8. The method of claim 7, wherein the power units are represented in Watt.

9. A computer-readable storage medium storing computer-readable instructions executable by one or more processors, that when executed by the one or more processors, cause the one or more processors to perform acts comprising:
   receiving power statuses of resources of a system, the system capable of providing the resources;
   quantifying the power statuses of the resources;
   calculating an available soft capacity of the system based on the quantified power statuses and a total capacity of the system; and
   providing an assigning amount of the resources beyond the calculated available soft capacity to one or more users.

10. The computer-readable storage medium of claim 9, wherein providing the assigning amount of the resources beyond the calculated available soft capacity to one or more users comprises:
    determining that at least one user of the one or more users requests resources from the system;
    assigning an amount of resources to the at least one user based on the requested resources;
    determining that a consumed amount of resources by the at least one user is less than the assigned amount of resources; and
    returning at least a portion of a difference between the assigned amount of resources and the consumed amount of resources for assigning to other users of the one or more users.

11. The computer-readable storage medium of claim 9, wherein the acts further comprise:
    setting a threshold to resources to be assigned;
    determining whether the assigned amount of resources is greater than or equal to the threshold; and
    upon determining that the assigned amount of resources is greater than or equal to the threshold, stopping assigning the resources to a user requesting resources from the system.

12. The computer-readable storage medium of claim 11, wherein the threshold is set dynamically or periodically.

13. The computer-readable storage medium of claim 9, wherein the acts further comprise reserving a predetermined amount of resources to address a traffic peak.

14. The computer-readable storage medium of claim 9, wherein the available soft capacity of the system and the total capacity of the system are represented in power units.

15. The computer-readable storage medium of claim 9, wherein the quantified power statuses are represented in power units.

16. The computer-readable storage medium of claim 15, wherein the power unit is Watt.

17. An apparatus comprising:
    one or more processors; and
    a memory communicatively coupled to the one or more processors, the memory storing computer-executable modules executable by the one or more processors, the computer-executable modules including:
    a power management module configured to collect power statuses of resources of a system, the system capable of providing the resources, the power management module being further configured to quantify the power statuses of the resources; and
    a providing module configured to calculate an available soft capacity of the system based on the quantified power statuses and a total capacity of the system, and to providing an assigning amount of the resources beyond the calculated available soft capacity to one or more users.

18. The apparatus of claim 17, wherein the providing module comprises:
    a user request determination module configured to determine that at least one user of the one or more users requests the resources from the system;
    a resource assigning module configure to assign an amount of resources to the at least one user based on the requested resources; and
    a resource consumption adjustment module configured to return at least a portion of a difference between the assigned amount of resources and the consumed amount of resources for assigning to other users of the one or more users.

19. The apparatus of claim 17, further comprising a threshold setting module configured to set a threshold to resources to be assigned.

20. The apparatus of claim 17, further comprising a resource reservation module configured to reserve a predetermined amount of resources to address a traffic peak.

* * * * *